(No Model.)

R. GRACEY.
VEHICLE SHAFT.

No. 448,611.  Patented Mar. 17, 1891.

WITNESSES  INVENTOR
N. L. Gill  Robert Gracey
N. B. Corwin

UNITED STATES PATENT OFFICE.

ROBERT GRACEY, OF ALLEGHENY, ASSIGNOR OF ONE-HALF TO CHARLES B. GRACEY, OF CORAOPOLIS, PENNSYLVANIA.

VEHICLE-SHAFT.

SPECIFICATION forming part of Letters Patent No. 448,611, dated March 17, 1891.

Application filed June 16, 1890. Serial No. 355,537. (No model.)

*To all whom it may concern:*

Be it known that I, ROBERT GRACEY, of Allegheny, in the county of Allegheny and State of Pennsylvania, have invented a new and useful Improvement in Couplings for the Cross-Bars of Vehicle-Shafts, of which the following is a full, clear, and exact description, reference being had to the accompanying drawings, forming part of this specification, in which—

Figure 1:
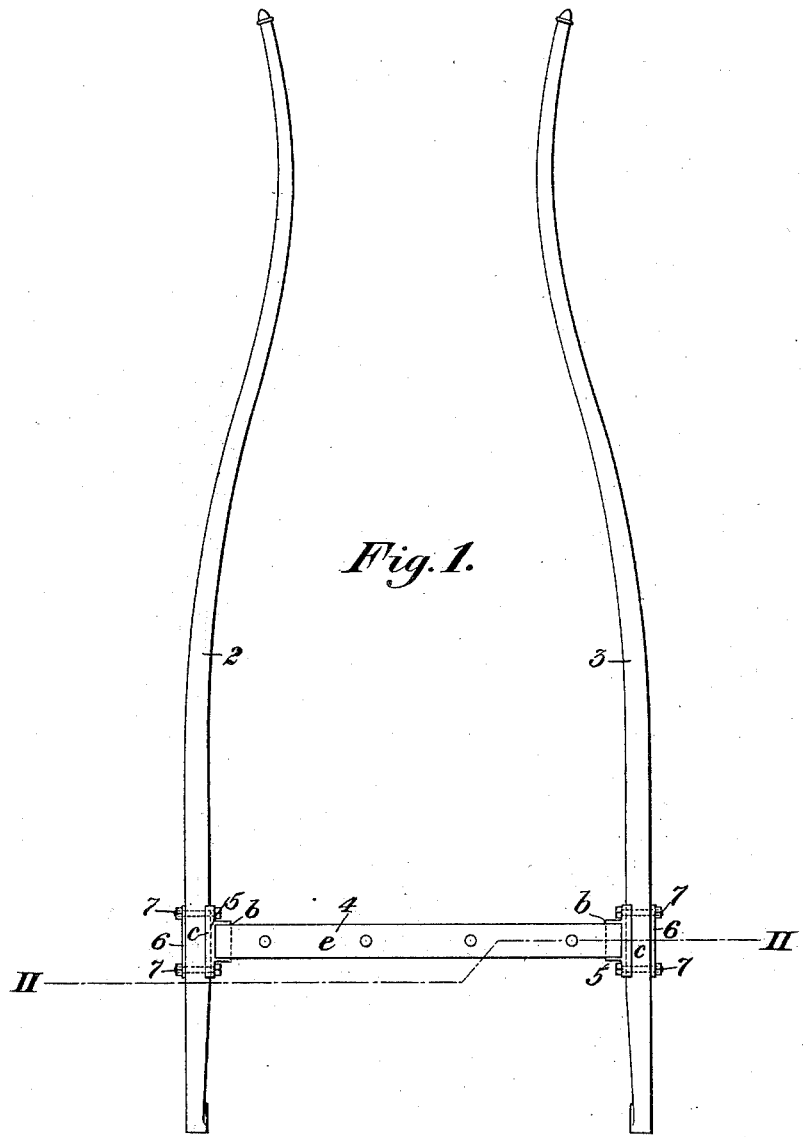
Figure 2:
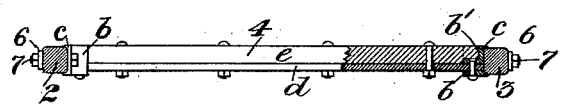

Figure 1 is a plan view showing the shafts of a vehicle provided with my improved clamp-coupling device. Fig. 2 is a cross-section on the line II II of Fig. 1.

In the drawings, 2 and 3 are the shafts of a vehicle, 4 the cross-bar of the shafts, and 5 5 are parts of the coupling devices by which the cross-bar is fixed to the shafts. These parts 5 are preferably constructed as shown in the drawings. Each comprises a metal socket-piece for the end of the cross-bar, and an attaching plate or flange $c$ integral with the socket-piece and adapted to fit on or against the inner side of the shaft. The socket-piece is preferably formed with a hollow portion $b$, adapted to receive the end of a metal bar or strip $d$, forming part of the cross-bar, and with a recess or open socket $b'$, adapted to receive the end of a wooden bar $e$, also forming part of the cross-bar. The metal bar $d$ is preferably held in place by means of a bolt or rivet passing through the bar and through the sides of the socket. It should be understood, however, that the presence of the two socket portions is not essential to my invention, since the clamp may have but a single socket in which the end of the cross-bar may fit, and the socket, whether open or closed, may be extended to any suitable length; nor is it essential that the cross-bar should be made of two pieces, as shown in the drawings, since it may be made of a single piece of wood or metal. The other parts 6 of the couplings are plates or bars of metal of suitable form to fit against the opposite side of the shaft. Both parts of the coupling are clamped firmly to the shaft by means of connecting-bolts 7, which may conveniently be passed through the body of the shaft. The coupling and shaft are thus held so rigidly together that all rattling of the joint is prevented, and in case the coupling becomes loose by reason of shrinkage or wear of the shaft it may be reclamped by tightening the bolts. This is a feature of advantage not possessed by any other coupling known to me.

It will be understood that many changes in the form and proportions of the parts of the coupling may be made without involving a variance from the principles of the invention, as stated in the broad claim of this application, all that is necessary being that there shall be a two-part clamp for the shaft combined with or integral with a socket in which the end of the cross-bar is received and held.

I claim—

1. The combination of vehicle-shafts, a cross-bar extending between them, and a clamping device consisting of a two-part clamp, the parts of which are fitted to the inner and outer sides of the shaft, and the inner part having a lateral socket directed toward the side of the other shaft and adapted to hold the end of the cross-bar, and means for drawing the parts of the clamp together tightly on the interposed shaft, substantially as and for the purposes described.

2. As a device for uniting a cross-bar to vehicle-shafts, the combination of a two-part clamp adapted to fit on opposite sides of the shaft, a double socket for receiving the end of a compound cross-bar, and means for drawing the parts of the clamp together on the interposed shaft, substantially as and for the purposes described.

In testimony whereof I have hereunto set my hand this 13th day of June, A. D. 1890.

ROBERT GRACEY.

Witnesses:
 W. B. CORWIN,
 H. M. CORWIN.